United States Patent [19]

Hermosilla-Ortega et al.

[11] Patent Number: 5,241,581
[45] Date of Patent: Aug. 31, 1993

[54] MAINTENANCE TERMINAL OF A VALIDATION AND IDENTIFICATION UNIT

[75] Inventors: Angel Hermosilla-Ortega; Juan J. Prieto-Renieblas, both of Madrid, Spain

[73] Assignee: Telefonica de Espana S.A., Madrid, Spain

[21] Appl. No.: 830,331

[22] Filed: Jan. 31, 1992

[30] Foreign Application Priority Data

Feb. 11, 1991 [ES] Spain .................................. 9100354

[51] Int. Cl.⁵ .............................................. H04M 1/24
[52] U.S. Cl. ........................................ 379/21; 379/27; 379/29
[58] Field of Search ...................... 379/27, 29, 31, 155

[56] References Cited

U.S. PATENT DOCUMENTS 4,922,516  5/1990  Butler et al. ........................ 379/27

*Primary Examiner*—Stafford Schreyer
*Attorney, Agent, or Firm*—Mason, Fenwick & Lawrence

[57] ABSTRACT

Maintenance terminal of a validation and identification unit defined as a tool designed to accomplish two functions allowing the local initialization of the validation and identification unit or of the adaptation unit of public modular telephones, so being not necessary for the operation system of modular telephones to call these, allowing extensive diagnosis and failure identification, also in a local mode, whenever the central processing unit be operative through the use of an interactive man-machine language.

3 Claims, 1 Drawing Sheet

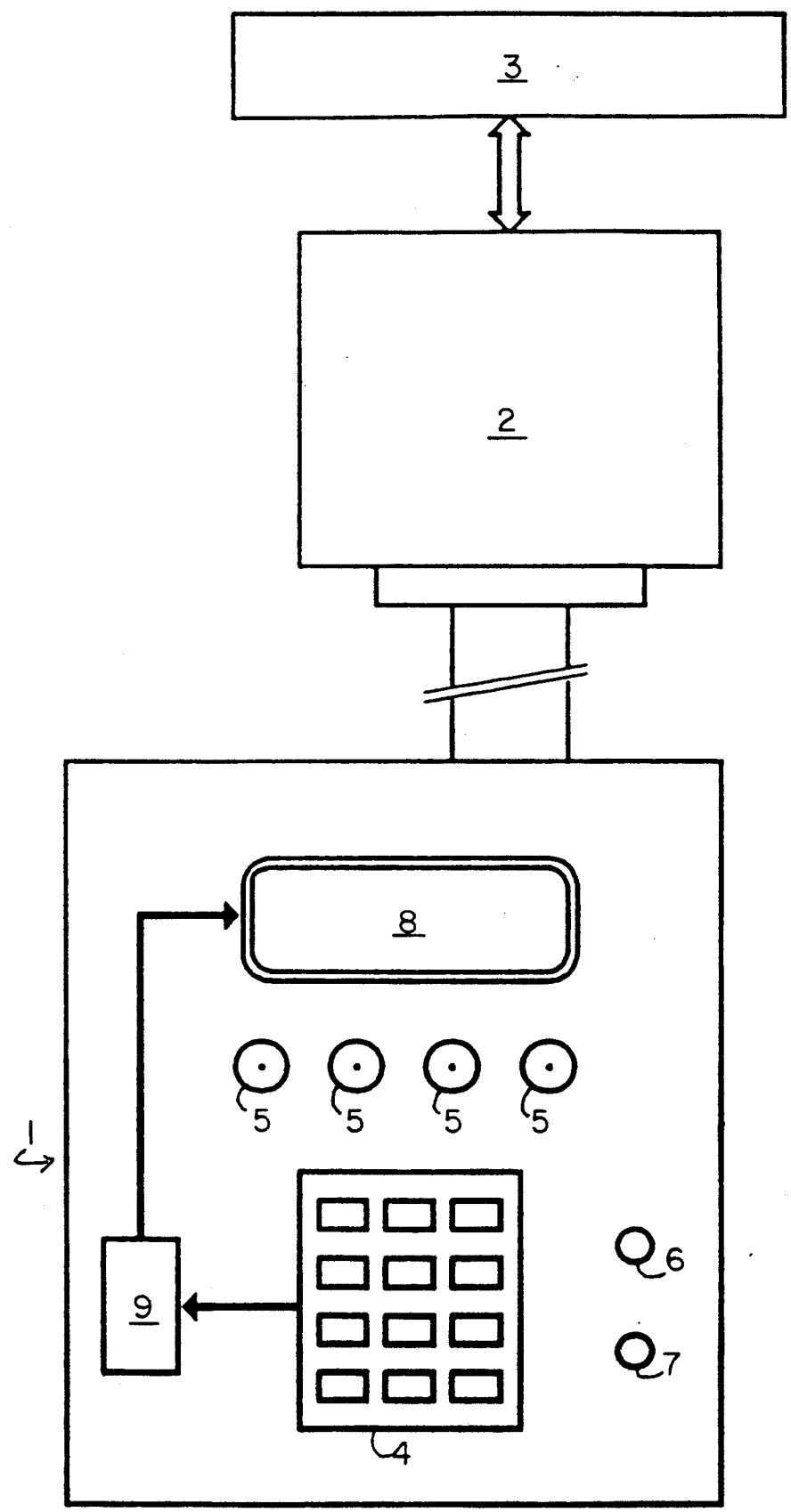

MAINTENANCE TERMINAL OF A VALIDATION AND IDENTIFICATION UNIT

SUMMARY OF THE INVENTION

This invention refers to a maintenance terminal of a validation and identification unit, the evident purpose of which is to serve as a tool designed to accomplish two functions, on the one side to allow the local initialization of the validation and identification unit (UVI), or of the adaptation unit of public modular telephones (UATM), so being not necessary for the operating system of modular telephones (SETM) to call these, and to allow extensive diagnosis and failure identification, also in a local mode, whenever the central processing unit (CPU) be operative, all the above mentioned being obtained by means of an interactive man-machine language.

FIELD OF THE INVENTION

The present invention applies to the telecommunication field, specifically as a support to the new service of public modular telephone which allows to carry out calls through the use of several modes of payment.

BACKGROUND OF THE INVENTION

Related art

Said maintenance terminal of the validation and identification unit has an application within the management system of a public modular telephone, and its features are defined in accordance with the possibility of being used for maintaining units of said system, which carry out the realization and collection of telephone calls through credit cards and other modes of payment.

This service being a new creation, there are no direct background on this point.

DESCRIPTION OF THE INVENTION

The maintenance terminal of the validation and identification unit proposed by the invention is designed as another peripheral more for the microprocessor of the CPU, located on the validation and identification unit, or on the adaptation unit of public modular telephones.

More specifically, the maintenance unit of the validation and identification unit in question is constituted by two fundamental elements:

A) A printed circuit board, which has, on its back, a connector through which the back panel of the validation and identification unit is connected, or also to the adaptation unit of public modular telephones, on the chassis of the second feeding module.

B) An utilization box connected to the printed circuit, on the front end of which there is a display of 4×20 characters, a dialing keyboard, four function pushbuttons, which are serigraphed as SW1, SW2, SW3 and SW4.

Likewise, the utilization box includes a contrast setting for the display and a LED diode indicating the terminal operation.

The utilization box is composed of two functional blocks, which are constituted by an integrated circuit and the mentioned 4-lines display with 20 characters per line.

Its communication with the central processing unit is through a parallel bus.

In order to avoid to interfere the signals of the remainder of the system, the terminal is fitted with buffers.

The integrated circuit opens the keys and prepares a free-rebound binary code, suitable to be red by polling via the central processing unit.

The access cycle to the integrated circuit has been set so that it will more than cover the delays caused at the interconnecting unit and the integrated circuit inherent requests.

To write data, the terminal has a keyboard matrix with keys numbered from 0 through 9 for the inlet of numbers. To this keyboard are added keys marked with symbols * and
for reserve purposes.

Also, there are other four function keys SW1, SW2, SW3 and SW4, the value of which can be formed again according to the indicators of the four line of display.

The first three lines show to the operator the system evolution.

BRIEF DESCRIPTION OF THE DRAWINGS

In order to complement the present description, and in order to help to a better comprehension of the features of the invention, the attached drawing, which is a part of the present specification, shows, in an illustrative and non limitative manner, the terminal, which is the object of the present invention, connected to the validation and identification unit, or to the adaptation unit of public modular telephones.

DETAILED DESCRIPTION OF THE PREFERRED EMBODIMENTS

From the single FIGURE it can be seen a maintenance terminal of the validation and identification unit which is the object of this invention, and referenced by (1), showing the connecting board (2), which are connected to the interconnection unit (3) of the validation and identification unit, the terminal being ready to operate.

The maintenance terminal of the validation and identification unit includes a keyboard matrix (4) with both numeric and standby keys, and function pushbuttons (5), as well as a contrast setting potentiometer (6) and a LED diode indicating the unit is operating.

Also, it can be seen that the terminal has a display (8) and an integrated circuit (9).

To connect the terminal to the back panel of the validation and identification unit, the feed must be, inexcusably, totally turn off, in order to fit then the terminal and to activate the feed.

Once the maintenance terminal of the validation and identification unit has been connected as previously described, the terminal allows to carry out "in situ" the following programming and controlling functions:

- Initialization and repairing functions.
- Alarm display and erase.
- Operating parameters display.
- Checking the elements of the validation and identification unit or of the adaptation unit of public modular telephones.

To carry out these functions, an interactive man-machine program is available, a function menu being displayed on the screen of the terminal, these functions being selected via the digit keyboard and the function keys, the display showing the several messages and parameters.

To accede the program, the validation and identification unit must be connected to the terminal, on the interconnecting unit, specifically on one of the two connectors of the feed unit.

Later on, the validation and identification unit detects the presence of the terminal and several messages appear on the display.

To exit out of the program, the terminal is pulled out.

Once the connection has been established, the different functions, shown by the display in the mode of function menu, can be executed by placing in front of each of them a code (SW1, SW2, SW3 or SW4).

Upon pressing the corresponding function key, it can be acceded.

In order to answer the parameter function or inlet, the two upper lines of the display are reserved.

The valid digits for entering the parameters are 0 to 9.

The two lower lines on the display are reserved to auxiliary functions within each function, these being handled with the function pushbuttons.

Upon connecting the validation and identification unit, once the terminal, which is the object of the present invention, has been installed, the terminal carries out an operation selfchecking, after which a configuration screen appears on the display, showing how many line modules are present, as well as their operation software version.

This is also shown for the central processing unit and the communications unit.

It also shows the activation of the X.25 or of the adaptation unit of public modular telephones, as well as the activation of the V.22bis modem.

From this screen, by pressing the corresponding function key, the following can be selected among these functions:
- Initialization
- Dump
- Repair
- Alarms
- Parameters
- Tests To accede to any other function, it will be sufficient to press the corresponding digit, to execute then, via both keyboards, the tasks which are adequate for the selected function.

By pressing the numeric key ONE, the initialization function is acceded, which allows to carry out the first intallation of the validation and identification unit or of the adaptation unit of public modular telephones.

This is made by sending the operation system of public modular telephones (SETM) the initialization message so that this dumps the operating parameters.

This situation implies that, from this moment on, the operation system of public modular telephones records, and can identify, all the communications with the validation and identification unit.

In this menu, all the operating parameters of the validation and identification unit are shown, and the call function to the operation system of public modular telephones can be acceded, where the validation and identification unit, or the adaptation unit of public modular telephones, dials the number of the operation system of public modular telephones automatically, exchanging with it different messages.

By pressing the numeric key TWO, the dump menu is acceded, so allowing to dump the validation and identification unit.

For it, it send the operation system of public modular telephones the final message and all the informations pending of sending existing in the validation and identification unit, or in the adaptation unit of public modular telephones at that moment, in a message similar in its content to the daily routine one, but pointing out to the operation system of public modular telephones that the validation and identification unit is going to cease sending also information on billing, if this were pending.

By pressing the numeric key THREE, the repair menu is acceded, so allowing to execute sending functions to the operation system of public modular telephons, the franchise code and the parameter dump.

The menu acceded by the Key FOUR corresponds to alarms, allowing to visualize the alarms generated by the equipment on its normal operation, showing at the same time the state of same in real time.

Also, the messages sent by the module of the central processing unit to the operation system of public modular telephones are so shown, the existing collection messages, the existing daily routine messages, the parameters pending of sending messages, and the own alarm messages.

Through the key number FIVE, the parameters menu is acceded, so allowing to consult the parameters entered on the initialization.

By pressing the numeric key SIX, the test menu is executed, this menu allowing to carry out an automatic test of the equipment components, showing failures able to seriously involve the operation of the equipment.

With this menu, it is possible to establish the correct operation of all line units and each of them separately, as well of the communications unit and all communications chain in X.25 contained in the modules of the central processing unit and communications unit.

In all these menus, the four function pushbuttons are defined with different characteristics, carrying out various access, enter, oulet functions, modifications and corrections of mistakes.

It is not considered necessary to make more extensive this description for any expert in the art to understand the scope of the invention and the advantages derived from it.

The materials, shape, size and arrangement of the components will be liable to variation whenever this does not mean to change the essence of the invention.

The terms used in this specification should be always taken in a wide and non limitative sense.

I claim:

1. A maintenance terminal for the validation and identification unit of a public telephone, comprising:
   a display;
   a keyboard matrix;
   four function push buttons;
   a printed circuit card coupled to said display, said keyboard matrix and said four function push buttons, said printed circuit card including an integrated circuit means excited by said keyboard matrix, for verifying the correct operation of a validation and identification unit or an adaptation unit of a public modular telephone; and
   coupling means for coupling said printed circuit card with the validation and identification unit or the adaptation unit.

2. The maintenance termination as set forth in claim 1, further including protocol means for communicating with an operation system of a modular telephone to permit the operation system to enable, disable and reset the validation and identification unit for the adaptation unit.

3. The maintenance terminal as defined in claim 1, wherein activation of said keyboard matrix causes said maintenance terminal to verify and check the operation of the adaptation unit or the validation and identification unit to which said maintenance terminal is coupled.

* * * * *